Feb. 14, 1933.   H. W. KIMBER   1,897,520

FLOWER RECEPTACLE FOR GRAVES

Filed Jan. 29, 1932

INVENTOR.
HERBERT WILLIAM KIMBER
BY
ATTORNEYS.

Patented Feb. 14, 1933

1,897,520

UNITED STATES PATENT OFFICE

HERBERT WILLIAM KIMBER, OF OAKLAND, CALIFORNIA

FLOWER RECEPTACLE FOR GRAVES

Application filed January 29, 1932. Serial No. 589,715.

The present invention relates to improvements in flower receptacles for graves, and the principal object of the invention is to provide an improved flower receptacle which may be easily positioned on the grave and removed.

A further object of the invention is to provide a flower receptacle that when placed in position will not interfere with gardening operations such as the operation of a lawn mower, and that on the other hand is reinforced in such a manner as not to be injured by accidental striking of the receptacle by a lawn mower or garden tools.

A further object of the invention is to provide a flower receptacle of the character described which may be manipulated by means of a suitable handle which may be swung into inactive position so as not to interfere with any other operations.

Further objects and advantages of my invention will appear as the specification proceeds.

Figure 1:
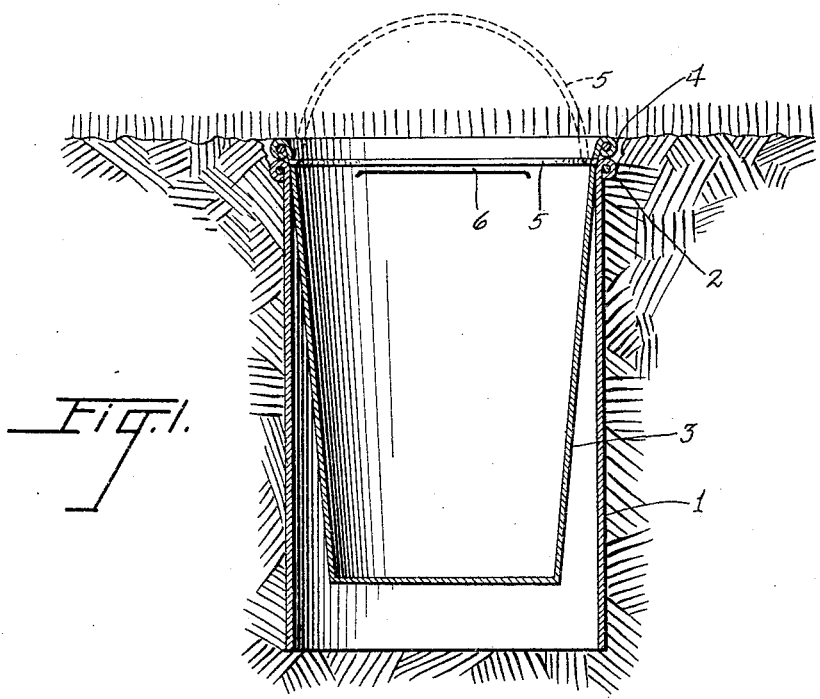
Figure 2:
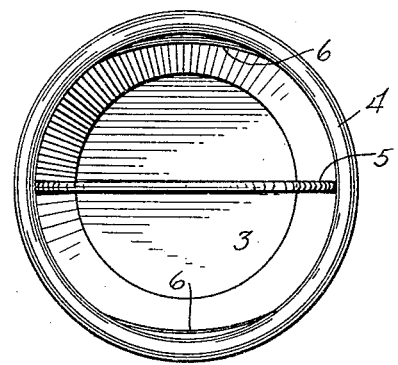

The preferred form of my invention is illustrated in the accompanying drawing in which Figure 1 shows a vertical section through my flower receptacle, and Figure 2 a top plan view of the same.

While I have shown only the preferred form of my invention, I wish to have it understood that various changes or modifications may be made within the scope of the claims hereto attached without departing from the spirit of the invention.

In its preferred form my flower receptacle consists of two pieces, one of which is a cylindrical member 1 adapted for insertion into the earth surface as indicated in Figure 1. The cylindrical member is open at both ends and is formed with a bead 2 along its upper edge. When this member is in position its bead 2 preferably is a slight distance below the surface of the soil as shown in the drawing. The second piece is a flower pot or can 3 adapted for insertion into the cylindrical member and removable therefrom. The flower pot is also provided at its upper edge with a bead 4 which is adapted to rest on the bead 2 on the cylindrical member. The pot is tapered as shown in the drawing, and while its bead at the upper edge is substantially of the same circumference as the bead of the cylindrical member, the pot tapers down to a much smaller diameter toward the bottom. This particular shape of the flower pot facilitates the insertion and particularly the removal of the same. I have observed that where a flower pot is used which is cylindrical in form, it very often is extremely difficult to remove the flower pot due to the fact that grass grows between the flower pot and the cylindrical member 1 and causes the flower pot to stick.

To further facilitate the manipulating of the flower pot I provide a bail 5 which is pivoted to diametrically opposite points of the pot on the inside thereof, and which is semi-circular in form and dimensioned so as to fit inside of the bucket when it is swung into the downward position shown in full lines in Figure 1. Just below the bail when the latter is in a horizontal position the material of the flower pot is indented as shown at 6 to provide a rest for the bail, and to prevent the latter from swinging downwardly beyond a horizontal position. The bail is shown in Figure 1 in operative position in dotted lines.

A flower receptacle made in accordance with my invention may be manipulated very easily. Due to the tapered form of the flower pot its removal from the cylindrical member 1 is always easily accomplished and requires very little force. The manipulation is facilitated by the bail 5 which is normally hidden within the confines of the flower pot, and which may be readily swung into active position by the operator. The flower pot is held against jamming by the bead 4 which rests on the bead 2, and which prevents the flower pot from going beyond a predetermined depth. The bead of the flower pot being just below or on a level with the earth surface, it does not interfere with operations of the lawn mower or other tools, and if struck accidentally it offers considerable resistance to any bending. The bail also is normally out of reach of any tool that may be used around the grave, and still is readily accessible if it is desired to remove the flower pot.

I claim:

1. A flower receptacle for graves comprising a cylindrical member adapted for insertion into the earth surface and a flower pot adapted for insertion into the cylindrical member, the flower pot being tapered to facilitate its insertion and removal and having a bail swingably mounted therein.

2. A flower receptacle for graves comprising a cylindrical member adapted for insertion into the earth surface and a flower pot adapted for insertion into the cylindrical member and having a bead along its top edge adapted to rest on the top edge of the cylindrical member and having a bail swingably mounted therein.

3. A flower receptacle for graves comprising a cylindrical member adapted for insertion into the earth surface and having a bead along its top edge and a flower pot adapted for insertion into the cylindrical member and having a bead along its top edge adapted to rest on the bead of the cylindrical member and having a bail swingably mounted therein.

4. A flower receptacle for graves comprising a cylindrical member adapted for insertion into the earth surface and a flower pot adapted for insertion into the cylindrical member, the flower pot being tapered for facilitating its insertion and removal and having a bail swingably mounted therein so as to allow the bail to come to rest when substantially in a horizontal position and to disappear entirely below the upper edge of the flower pot.

HERBERT WILLIAM KIMBER.